United States Patent [19]

Grenier

[11] Patent Number: 4,850,397
[45] Date of Patent: Jul. 25, 1989

[54] HEAT INSULATING JACKET WITH SNAP-LOCK SEAM

[75] Inventor: Claude A. Grenier, Mesa, Ariz.

[73] Assignee: The Zippertubing Co., Los Angeles, Calif.

[21] Appl. No.: 185,333

[22] Filed: Apr. 21, 1988

Related U.S. Application Data

[60] Continuation of Ser. No. 917,686, Oct. 10, 1986, abandoned, which is a division of Ser. No. 785,156, Oct. 7, 1985, abandoned.

[51] Int. Cl.⁴ ............................................. F16L 9/14
[52] U.S. Cl. ................................. 138/149; 138/110; 138/137; 138/168
[58] Field of Search ................. 138/99, 149, 157, 168, 138/162, 137, 128, 145, 156, 110; 24/576, 579; 174/DIG. 11; 428/57, 68, 76, 192, 193, 194, 195, 197, 206, 421

[56] References Cited

U.S. PATENT DOCUMENTS

| | | | |
|---|---|---|---|
| 2,937,664 | 5/1960 | Plummer | 138/168 X |
| 2,960,561 | 11/1960 | Plummer | 138/168 X |
| 3,233,699 | 2/1966 | Plummer | 138/149 X |
| 3,484,907 | 12/1969 | Elsenheimer | 24/579 |
| 3,638,286 | 2/1972 | Eichberg | 24/576 |
| 3,858,282 | 1/1975 | Plummer | 138/168 X |
| 3,925,856 | 12/1975 | Plummer | 138/168 |
| 4,213,487 | 7/1980 | Funk et al. | 138/149 |

FOREIGN PATENT DOCUMENTS

| | | | |
|---|---|---|---|
| 212242 | 12/1960 | Austria | 24/576 |
| 312954 | 4/1956 | Switzerland | 24/576 |

*Primary Examiner*—James E. Bryant, III
*Attorney, Agent, or Firm*—Christie, Parker & Hale

[57] ABSTRACT

An improved heat insulating jacket slit lengthwise thereof held closed by a unique pair of dissimilar separable snap-lock seam members formed of extruded plastic and designed for heat-fused assembly to the inner plastic layer of flexible laminated sheeting having an outer layer nonfusible to said seam members. Each seam member includes a narrow groove sized to snugly seat and conceal the adjacent lateral edge of the sheeting. Each seam member includes internesting snap-lock members positioned to interlock when laminated sheeting fused thereto is wrapped about ducting. A blanket of resilient heat insulating material is laminated to the inner plastic layer of the sheeting and aids in holding the seam members interlocked.

2 Claims, 1 Drawing Sheet

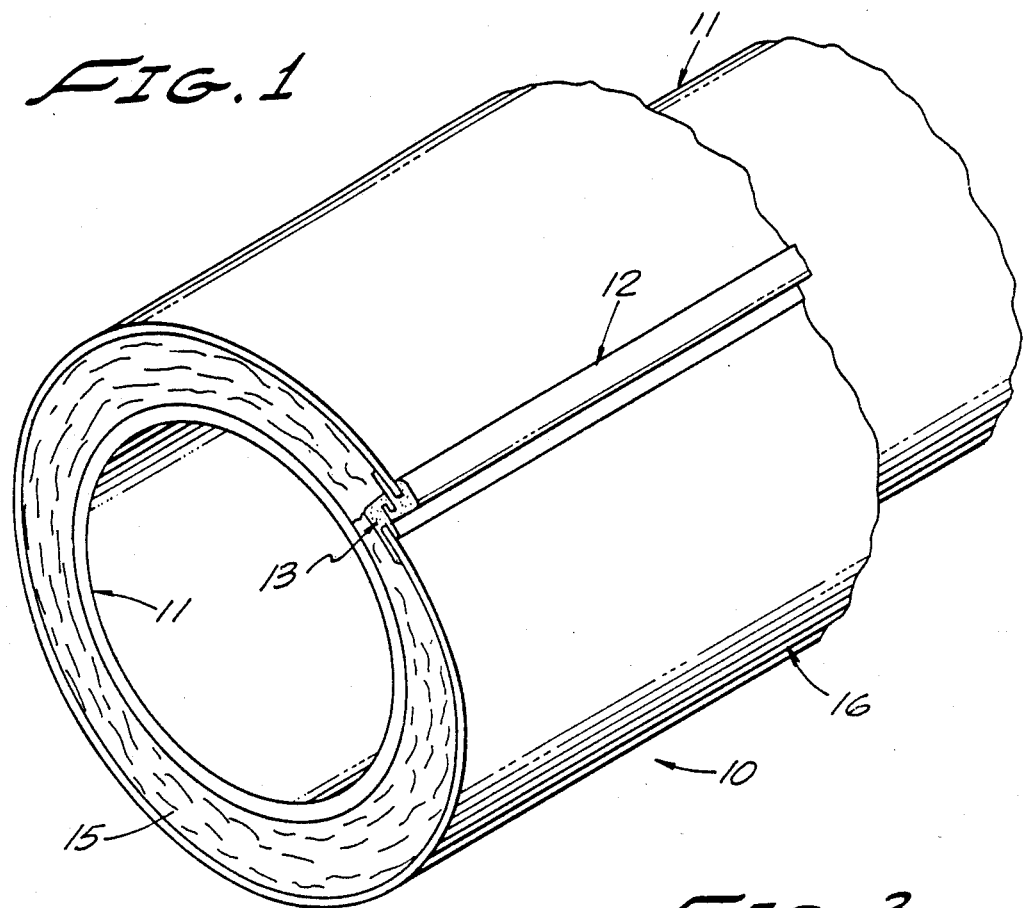
FIG. 1
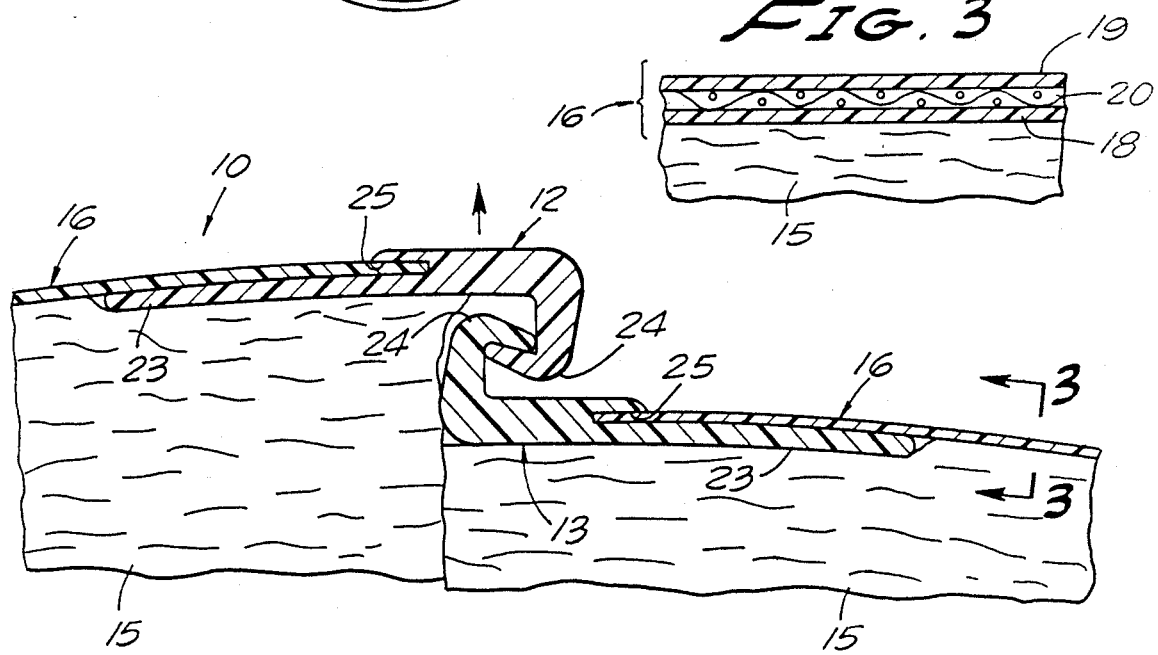
FIG. 3
FIG. 2

HEAT INSULATING JACKET WITH SNAP-LOCK SEAM

CROSS-REFERENCE TO RELATED APPLICATIONS

This is a continuation of application Ser. No. 917,686 filed Oct. 10, 1986 now abandoned, which is a division of my copending application for U.S. Letters Patent Ser. No. 06/785,156 filed Oct. 7, 1985, now abandoned, entitled Snap Lock Seam and Jacket Equipped Therewith.

This invention relates to interlocking plastic seam members, and more particularly to a unique pair of dissimilar extruded plastic seam members heat bondable to the inner fusible plastic layer of laminated sheeting having an outer layer of a material nonfusible to the seam members.

BACKGROUND OF THE INVENTION

Many proposals have been made heretofore for interlocking but separable plastic seam members for a wide variety of purposes and particularly for holding jacketing assembled about ducting. Typically, such seam members include a mounting web heat fusible to the lateral edges of plastic sheeting. Customarily such mounting web are attached to the outer surface of the plastic in order that one edge of the sheeting will underlie and extend across the inner side of the seam to safeguard against the material being enclosed interfering with the closure of the seam.

Prior proposals for separable seaming and jacketing usable therewith, fail to meet appearance and sanitation requirements of certain operating environments having need for exacting cleanliness, sanitation and appearance standards, as for example, in hospitals, food processing operations, ultra clean rooms for many manufacturing and assembly operations, and the like. In such environments it is mandatory that ducting and other components be jacketed with flexible main bodies having a highly smooth, nonporous outer surface and an inner main body material of flexible material satisfied by various types of fusible plastic sheeting suitably laminated to the high spec outer surface. An outer material satisfactorily meeting these requirements is not heat fusible to the plastic seam members. If the seam members are heat fused to the inner surface of such a laminated material then the full thickness of the sheeting lies externally of the seam and the lateral edge of the sheeting is closely spaced from the innernesting portions of the seam members when closed, thereby providing a shoulder and a substantially inaccessible recess in which foreign material can collect and render the jacketing unsightly and unacceptable in environments required to meet strict cleanliness and sanitary standards.

SUMMARY OF THE INVENTION

The foregoing and other objections of prior seams and jacketing assemblies for ducting as aforementioned are avoided by the present invention wherein extruded dissimilar plastic seam members are specially designed for assembly to laminated jacket sheeting. Each of the seam members is provided with a narrow groove sized to snugly seat the edge of specially compounded laminated sheeting and differing from one another in that the groove is on a different side of the mounting web of the two seam members. A further difference resides in the fact that the internesting portions of the seam members are differently disposed relative to the associated seating groove for the laminated sheeting. In consequence, the mounting web of each seam, when assembled to the sheeting, is fused to the plastic layer on the inner side of the sheeting and the two sheeting seating grooves are outermost and merge smoothly with the adjacent surface of the outer sheeting layer.

Accordingly, it is a primary object of the invention to provide an improved pair of dissimilar plastic seam members portions of which are of dissimilar cross section, in that each has a narrow groove sized to snugly seat the edge of a laminated sheet and an inner surface lying flush with a different surface of the two seam members.

Another object of the invention is the provision of a pair of extruded interlocking seam members having mounting webbs heat fusible to the inner layer of a laminated plastic sheeting with the opposite lateral edge of the two seam members provided with oppositely facing internestable, interlockable hooks.

Another object of the invention is the provision of a unitary heat insulating jacket assembly having a laminated main body of flexible material provided along the opposite lateral edges thereof with a pair of dissimilar extruded plastic seam members heat-fused to an inwardly facing plastic layer of said laminated main body and each of which seam members is provided on its outer face with a narrow groove seating and concealing a respective lateral edge of said laminated main body.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary perspective view showing an illustrative embodiment of the present invention jacket snugly assembled about a length of ducting;

FIG. 2 is a fragmentary end elevational view on an enlarged scale taken at one end of the interlocked jacket seam; and FIG. 3 is an enlarged cross sectional view taken along line 3—3 on FIG. 2 showing structural details of the laminated flexible main body of the jacket shown in FIGS. 1 and 2.

Referring to FIGS. 1-3 there is shown an illustrative embodiment of the invention jacket, designated generally 10, equipped with the dissimilar plastic seam members 12 and 13.

Referring to FIG. 3, it is pointed out that the flexible laminated sheeting 16 includes at least an inner plastic layer 18 of plastic material, such as polyvinylchloride, and an outer layer 19 of flexible impervious material having a relatively hard, polished, smooth exterior surface, such as polyvinylfluoride. The laminated outer body may also include an intermediate layer 20 of suitable reinforcing material, such as woven fabric or fiberglass, if additional strength and ruggedness is important. The inner and outer layers 18 and 19 are laminated to one another if additional ruggedness is not required, or, alternatively, these two layers are laminated to the opposite surfaces of the reinforcing layer 20.

The dissimilar seam members 12 and 13 are extruded from high strength plastic material and each includes a long body strip of generally J-shape in cross section including a wide mounting webb or stem portion and a hook-shaped return bend portion 24 integral with the other lateral edge of the seam member. Each seam member also is provided with a narrow groove 25 having its inner sidewall lying flush with the adjacent surface of the mounting web 23. However, the mounting groove 25 of seam member 12 is on the side of the seam member remote from its associated hook 24, whereas groove 25 on the other seam member 13 is on the same side of the seam as its hook member. The width of the grooves 25 is sized to have a snug interference fit with the thickness of the laminated main body 16 and the outwardly facing rim edge of the groove lip is preferably beveled so as to merge smoothly with the outer surface of sheeting 16.

Seam members 12 and 13 are assembled to the opposite lateral edge of the laminated cover 16 of the jacket with the edges of this jacket pressed firmly and fully into a respective seating groove 25 of the seam members. Thereafter, the mounting web portions 23 of the seam members are heat-fused to the inwardly facing inner plastic layer 18 of the laminated sheeting 16. This operation is well known to persons familiar with the assembly of plastic components capable of being heat-fused together. Thereafter, a blanket of the heat insulating material 15 of the requisite dimensions is placed against the inwardly facing surface of sheeting 16 and bonded thereto with a suitable adhesive.

The described unitary jacket of heat insulating material laminated to a seam-equipped impervious flexible cover is placed about ducting 11 and forcibly contracted until the hook-equipped seam members 12 and 13 can be interlocked with one another as shown in FIGS. 1 and 2. Upon release of the contraction pressures, the resilient heat insulating material 15 expands and places the laminated outer cover sheeting 16 into hoop tension with the opposite lateral edges of the heat insulating blanket 15 in pressurized abutment with one another. The lip edges of each of the hooks is held firmly seated in contact with the inner bottom portion of the other hook member.

The assembled jacketing presents an unusually neat appearance with a substantially continuous hard smooth, polished exterior surface resistant to the adherence of dirt, foreign material and readily cleansed should there be need therefor. Should it be necessary to gain access to the jacketed ducting 11, the jacket is easily detached by compressing the same from areas disposed from either side of the seam members adequate to disengage hooks 24, 24 from one another.

While the particular snap lock seam and jacket equipped therewith herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A jacket adapted to cover ducting comprising:
    an elongated strip of flexible laminated sheeting having a layer of polyvinyl fluoride on one face thereof and a heat fusible plastic layer on the other face thereof:
    first and second elongated separable seam members formed of extruded plastic each having a mounting web heat-fused to the opposite lateral edges of only the heat-fusible layer of said laminated sheeting;
    each of said seam members having a narrow groove snugly seating and concealing a respective lateral edge of said laminated sheeting such that a lip of said groove overlies a portion of said polyvinyl fluoride layer and the other lip of said groove is heat fused to said heat-fusible layer; and
    said seam members remote from said mounting web each having internestable hooklike portions shaped to interlock with one another when said strip is wrapped snugly about ducting.

2. A jacket as defined in claim 1 characterized in the provision of a thick layer of heat insulation material bonded to said heat-fusible layer of said laminated sheeting with the opposite lateral edges thereof positioned to abut one another snugly when said jacket is wrapped about ducting with said hooklike portions of said seam members interlocked with one another and cooperating to maintain said hooklike portions interlocked.

* * * * *